United States Patent [19]

Schimanski

[11] 4,041,601
[45] Aug. 16, 1977

[54] MACHINE TOOL WITH AN AUTOMATIC TOOL CHANGER

[75] Inventor: Freddie G. Schimanski, Portage, Mich.

[73] Assignee: Wells Manufacturing Corporation, Three Rivers, Mich.

[21] Appl. No.: 666,324

[22] Filed: Mar. 12, 1976

[51] Int. Cl.² ............................................. B23Q 3/157
[52] U.S. Cl. ..................................... 29/568; 214/1 BC
[58] Field of Search ....................... 29/568; 214/1 BC; 294/88

[56] References Cited

U.S. PATENT DOCUMENTS

| 2,902,178 | 9/1959 | Kramer | 294/88 X |
|---|---|---|---|
| 3,298,098 | 1/1967 | Gleisner, Jr. | 29/568 |
| 3,551,984 | 1/1971 | Goebel et al. | 29/568 |
| 3,572,519 | 3/1971 | Tezuka | 214/1 BC |
| 3,613,224 | 10/1971 | Newton et al. | 29/568 |
| 3,613,225 | 10/1971 | Sato et al. | 29/568 |

*Primary Examiner*—Othell M. Simpson
*Assistant Examiner*—Z. R. Bilinsky

*Attorney, Agent, or Firm*—Dressler, Goldsmith, Clement, Gordon & Shore, Ltd.

[57] ABSTRACT

A machine tool with an automatic tool changer in which a new tool is removed from a self-indexing storage magazine and loaded into a spindle journaled in the frame of the machine. A tool changer mechanism comprises a carriage slidably mounted on the frame for movement substantially parallel to the axis of the spindle and a boom pivotally mounted in the carriage. The boom has first and second telescoping transfer arms for receiving and conveying tools to the spindle and the magazine. The transfer arms are substantially coplanar and perpendicular to the axis of the spindle but displaced relative to each other at a fixed acute angle. Motors are provided for sliding the carriage to reciprocate the boom in a direction substantially perpendicular to the plane of the transfer arms and substantially parallel to the axis of the spindle, as well as for pivoting the transfer arms in a plane substantially normal to the spindle axis whereby each of the transfer arms can be positioned to engage a tool at the storage magazine and at said spindle.

10 Claims, 12 Drawing Figures

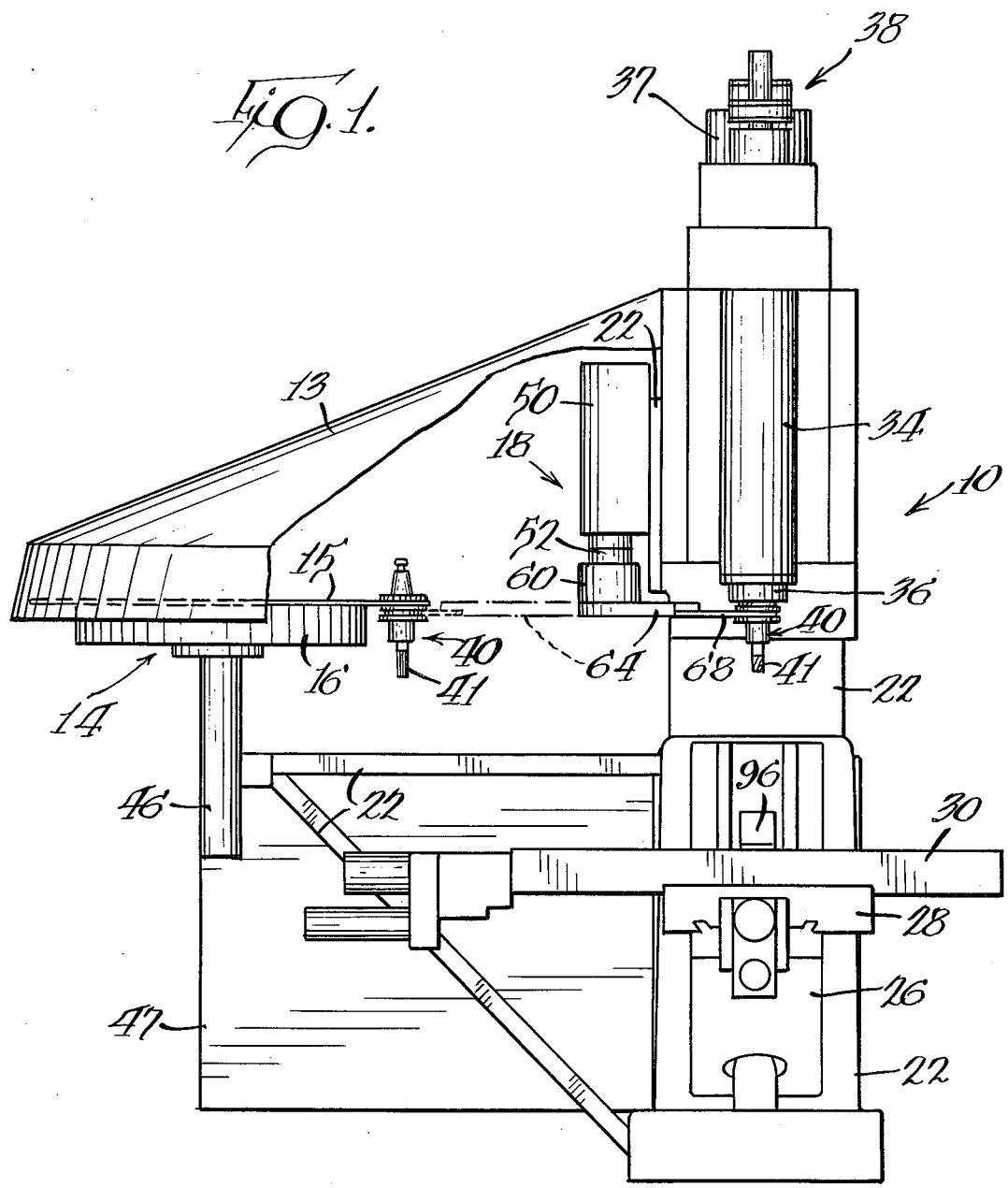

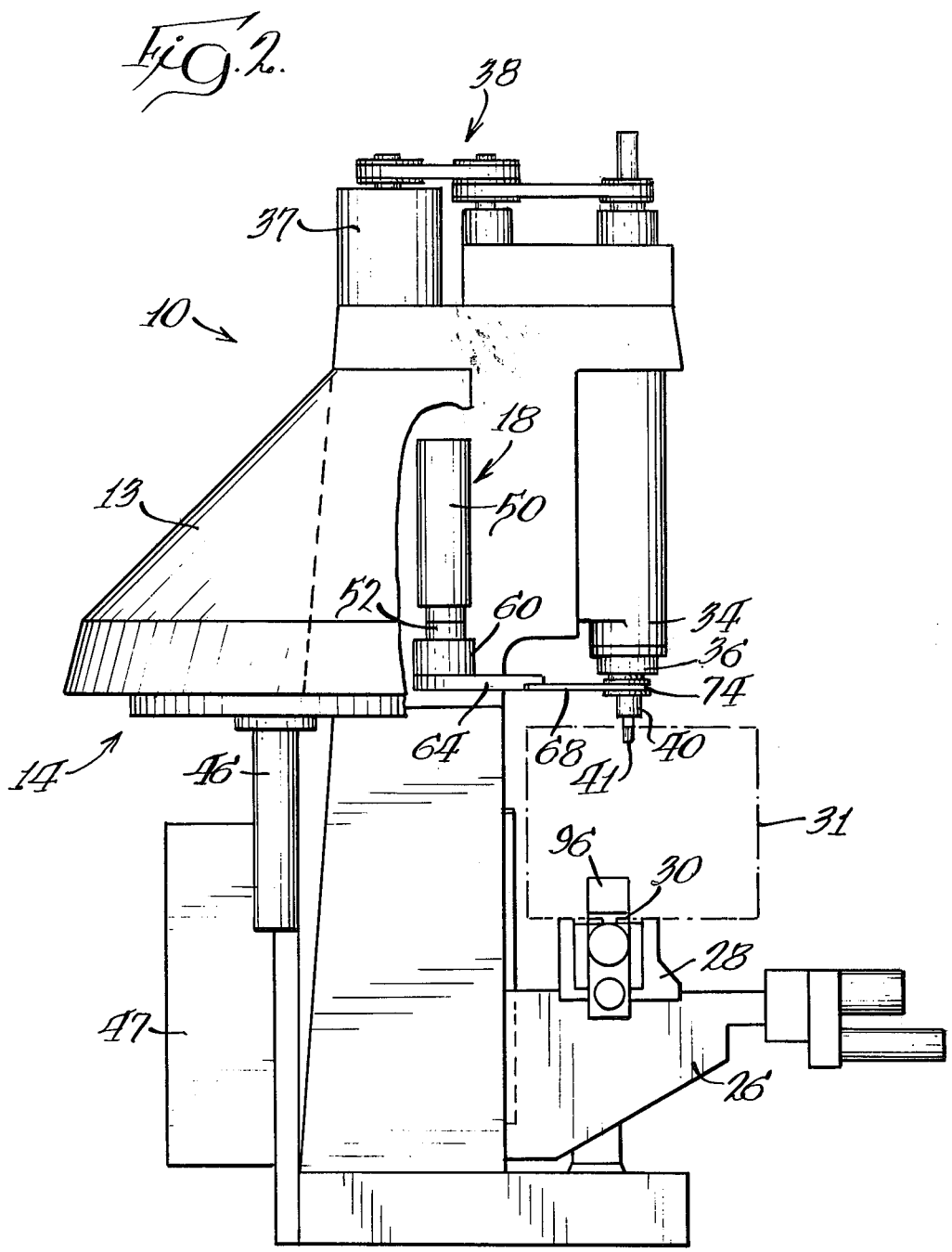

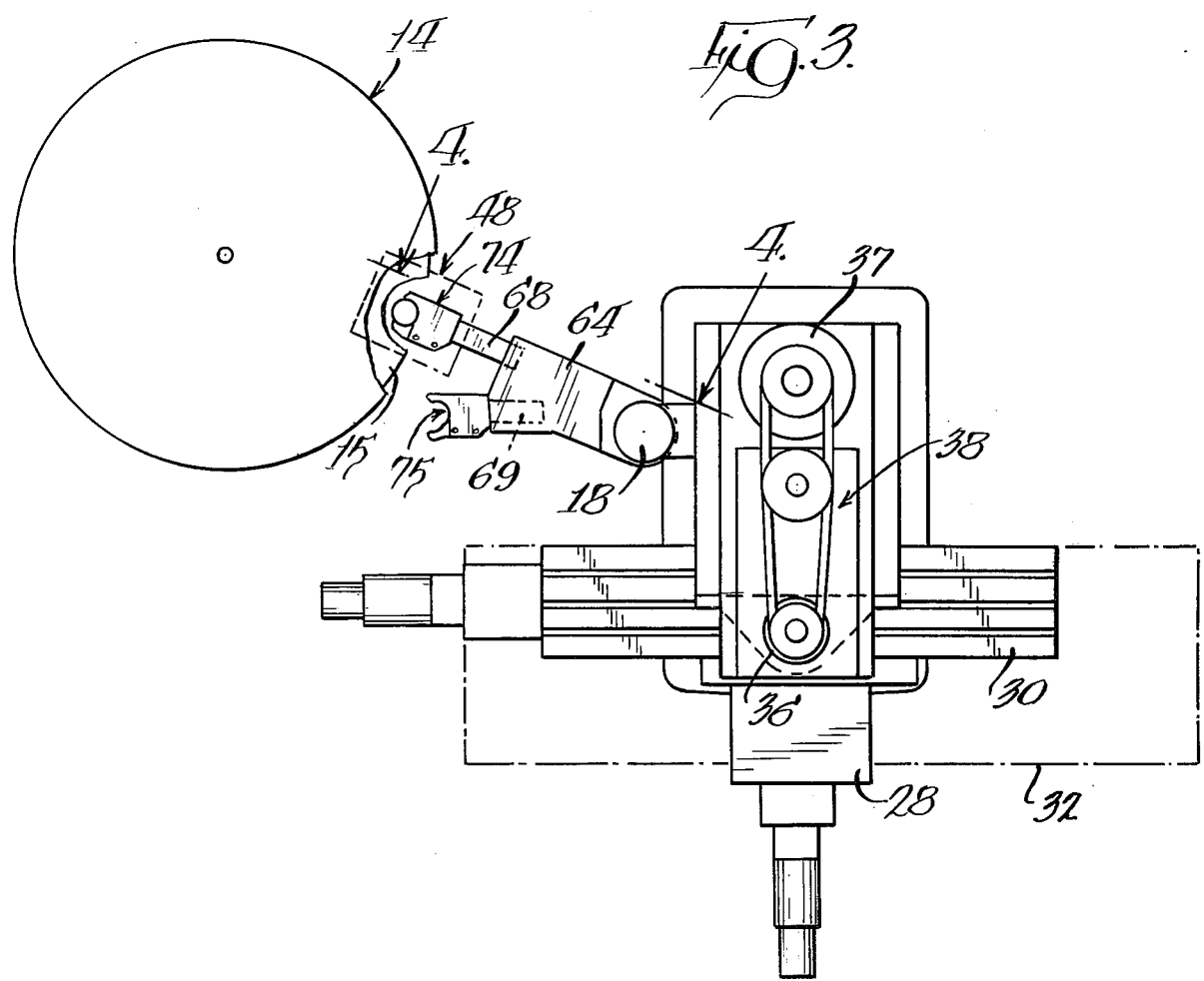

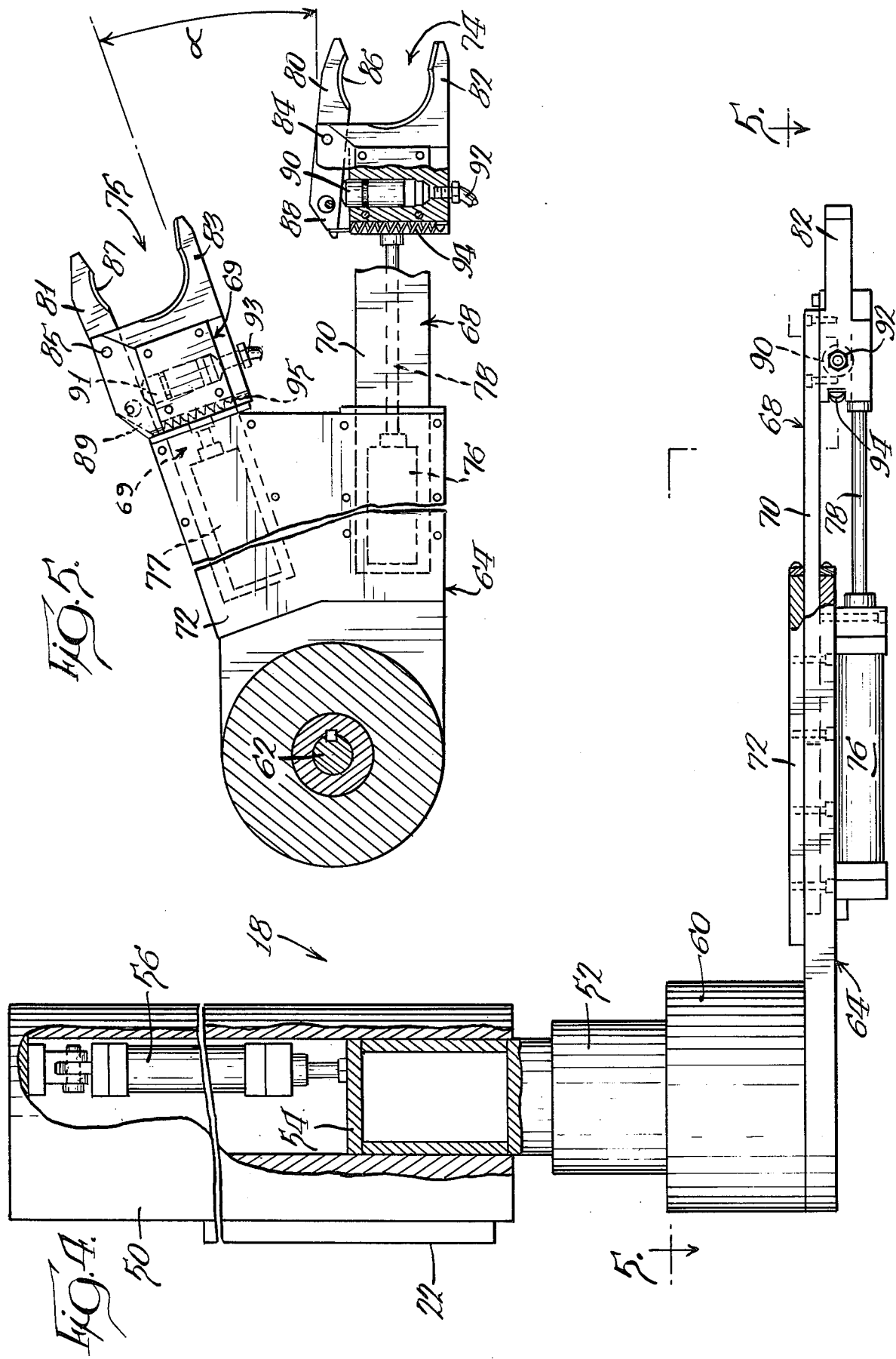

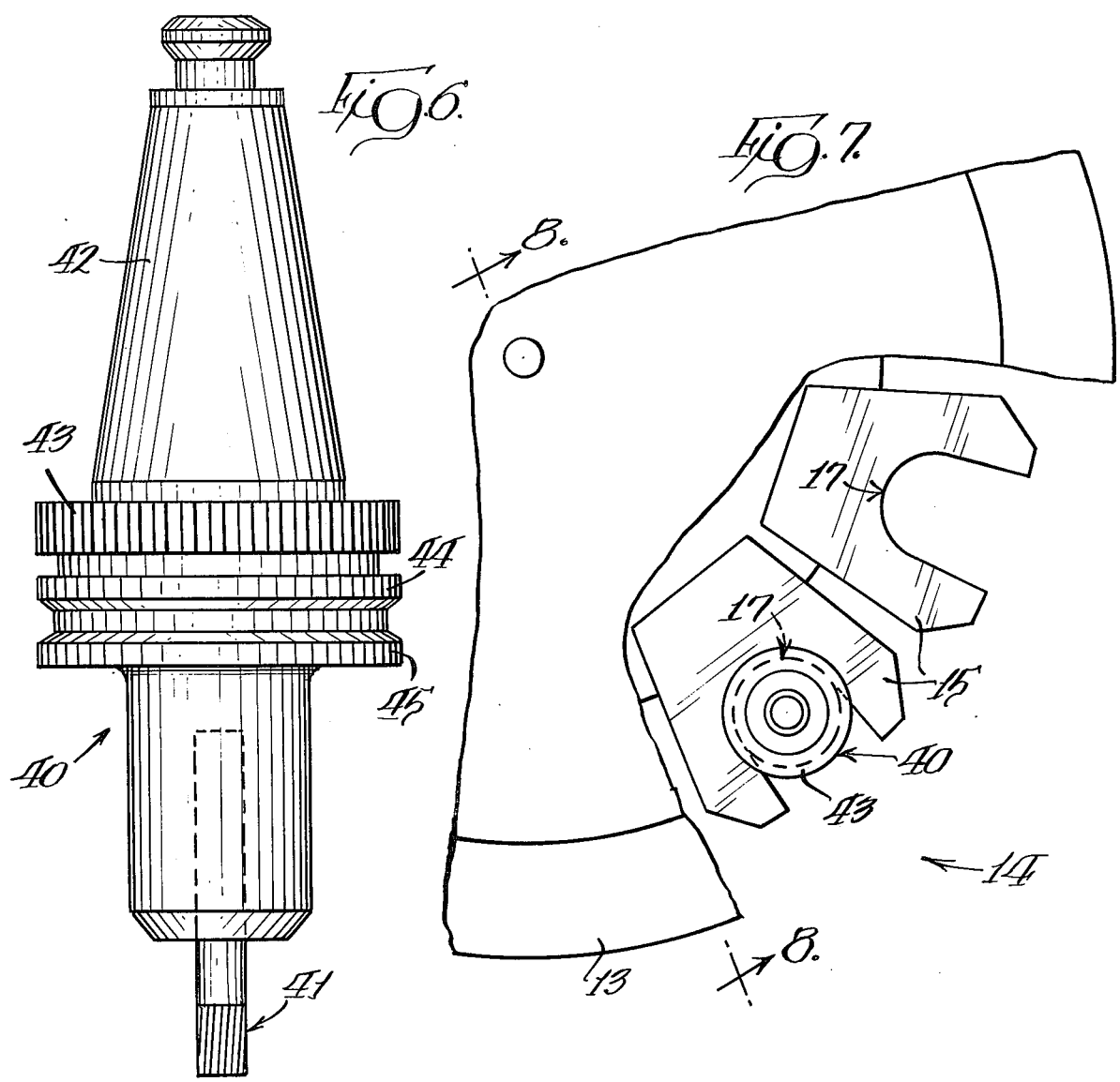
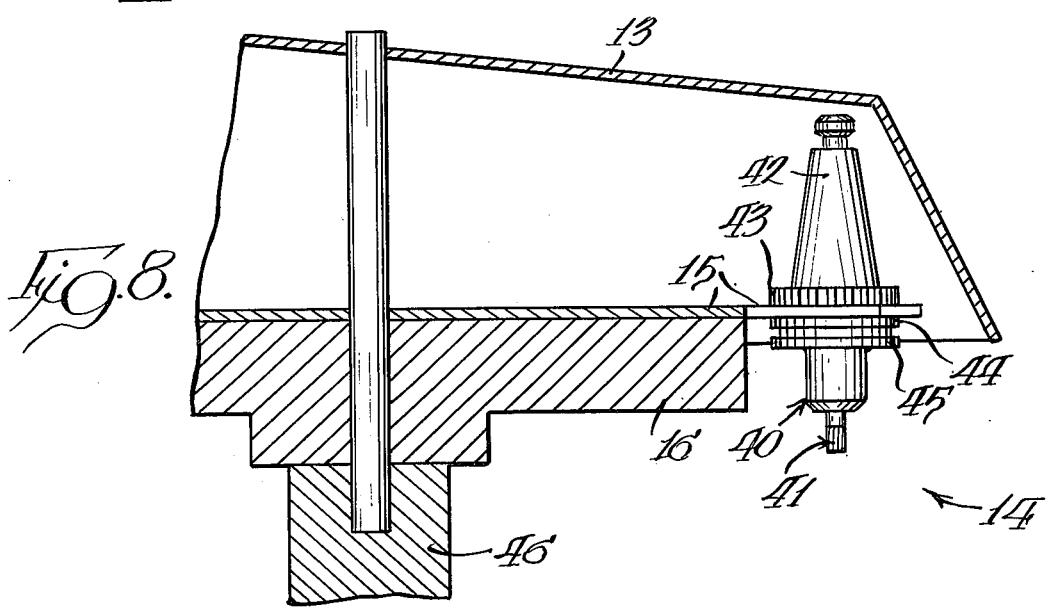

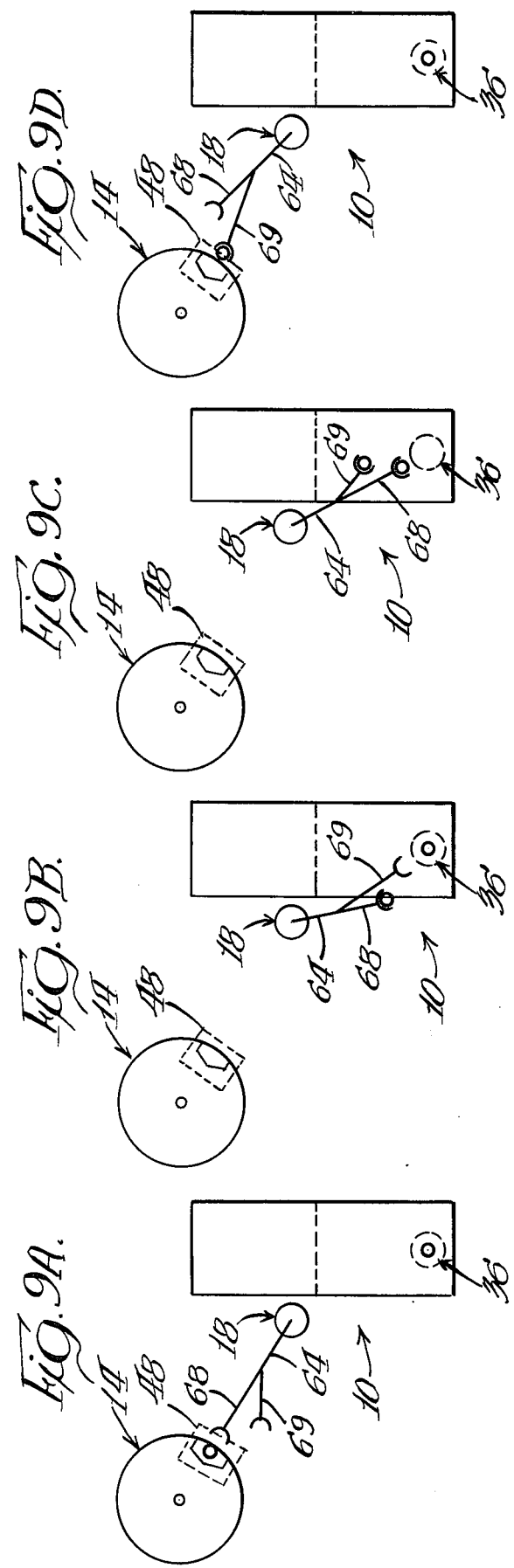

MACHINE TOOL WITH AN AUTOMATIC TOOL CHANGER

BACKGROUND OF THE INVENTION

This invention relates generally to a tool changing mechanism for a numerically controlled machine tool and more particularly to an improved automatic tool changer having a double arm construction allowing for very rapid changing of tools with a minimum of down time, thereby giving an especially short "chip-to-chip" interval.

In many common machine tools, the workpiece to be machined is placed upon a table that is mounted on the base of the machine for horizontal motion along two perpendicular axes. Any part of the workpiece thus can be brought into position to be acted upon by a tool secured to and driven by a spindle that rotates on a vertical axis above the work table and is carried by a spindle head mounted on the base of the machine for up and down motion along the vertical axis of the machine.

With the addition of numerical control, all of the motions of the machine components along all three axes can be automatically effected and controlled in accordance with a predetermined program. However, unless the machine is also equipped with an automatic tool changer by which tools can be removed from a tool storage magazine and inserted into the spindle and also withdrawn from the spindle and returned to the storage magazine, much of the advantage of numerical control is not realized.

In recent years, machine tools have been constructed with automatic tool changing mechanisms which allow a machine tool to utilize a large number of tools of various types. The machining operations are controlled by the so-called numerical control methods, and, after a particular machining action has been completed, the old tool is automatically removed from the machine spindle and placed in a tool storage magazine and a new tool is automatically taken from the tool storage magazine and placed into the machine spindle.

Machine tools equipped with automatic tool changers have been available for some time and several United States patents have been granted on such machines. Notable among those U.S. Pats. are the following:

Brainard et al. No. 3,286,344 Issued Nov. 22, 1966
Brainard et al. Reissue No. Re. 25,737 Issued Mar. 2, 1965
Meyer No. 3,316,629 Issued May 2, 1967
Meyer No. 3,466,971 Issued Sept. 16, 1969
Lehmkuhl No. 3,200,492 Issued Aug. 17, 1965
Hollis No. 3,412,459 Issued Nov. 26, 1968
Anthony No. 3,161,951 Issued Dec. 22, 1964
Swanson et al. No. 3,256,600 Issued June 21, 1966
Stark No. 3,276,116 Issued Oct. 4, 1966
Wakfield et al. No. 3,465,890 Issued Sept. 9, 1969
Harmon No. 3,466,739 Issued Sept. 16, 1969
Ollearo No. 3,545,075 Issued Dec. 8, 1970
Goebel et al. No. 3,551,984 Issued Jan. 5, 1971
Anderson No. 3,811,179 Issued May 21, 1974
Noguchi et al. No. 3,822,466 Issued July 9, 1974

The British Pat. No. 1,205,104 published Sept. 16, 1970 illustrates another prior art tool changer.

While the machines disclosed in some of the aforesaid patents are known to have achieved a measure of commercial success, in all of them the unproductive time spent in changing from one tool to another is a serious production-limiting factor.

It is very desirable to effect the automatic changing of the tool within as short a time interval as possible. With a machining job requiring a large number of different machining operations involving a large number of different cutting tools, the time required to change the cutting tools inbetween each separate machining operation can add up to a considerable amount of "down time."

The problem with existing automatic tool changers is that the transfer time required to change out a cutting tool is greater than desired. This is owing to the fact that the cutting tool transfer gripping jaws and arms are constructed and arranged to require a number of mechanical steps involving movements of transfer arms which require that the machine not be operating in the cutting mode until the completion of all or a large percentage of such movements. Additionally, time is lost while a desired tool is selected from a storage magazine or returned to a specific station in the magazine for subsequent retrieval.

SUMMARY OF THE INVENTION

The present invention improves upon the design of automatic tool changers by providing a shortened tool change-out cycle time and by providing a tool change-out sequence that permits the cutting process to continue while a number of steps in the tool change-out sequence, such as tool selection and ready positioning, are simultaneously being performed.

This invention accomplishes such a result by using a unique double arm tool transferring mechanism for a metal working machine such as a milling machine.

According to this invention, a carriage means is slidably mounted on the machine tool frame between a tool storage magazine and a rotatable tool spindle or similar device journaled in the frame. The tool storage magazine is at a fixed location relative to the frame and has a plurality of tool storage slots for storing a plurality of tools. The storage magazine can be rigidly mounted on an extension of the frame, if desired. A boom is pivotally mounted in the carriage. The boom is provided with two telescoping tool transfer arms that are substantially coplanar and perpendicular to the axis of the rotatable tool spindle of the metal working machine. The two transfer arms are displayed relative to each other at a fixed acute angle. Thus, the boom and the two transfer arms together form a substantially "Y-shape." The carriage is controlled and actuated for sliding on the frame to raise and lower the boom reciprocally and substantially perpendicular to the plane of the transfer arms and substantially parallel to the axis of the spindle. The boom is mounted on the carriage for rotating the transfer arms in a plane substantially normal to the spindle axis whereby each of the transfer arms can be positioned to engage a tool in the storage magazine as well as in the spindle.

With this type of construction, when it is desired to change a cutting tool, the initial tool selection steps of procuring a new tool from the storage magazine and ready positioning steps of moving it close to the rotating spindle can be accomplished while the cutting operation is still being performed with the old tool. Specifically, before the numerical control system of the machine terminates a metal cutting action, and when a new cutting tool is next required for the next cutting action, the control system actuates the tool storage magazine to automatically index to present a selected tool storage slot containing the new tool to an engaging position for pickup. Subsequently, one of the two transfer arms is moved to engage the new tool from the tool storage magazine slot. The tool is grasped by this transfer arm and removed from the storage slot in the storage magazine. Before the cutting action is terminated, both transfer arms are moved toward the machine tool spindle simultaneously and the other empty arm is aligned with the tool in the spindle. Then, the empty transfer arm engages and removes the tool from the spindle. The arm, carrying the removed tool, is then moved away from the spindle and the arm holding the new tool is simultaneously moved into alignment with the spindle. Subsequently, the arm carrying the new tool is moved to engage the new tool with the spindle. As soon as the new tool is in the spindle, both transfer arms are swung away from the spindle and the next cutting operation can begin. As the trailing transfer arm of the two arms clears the work area, i.e., the cutting cubicle which is defined by the vertical cutting frame and the horizontal cutting frame, the spindle is free to commence the next machining action with the new tool. While the next machining action proceeds, the transfer arm holding the tool removed from the spindle is then moved toward the tool storage magazine. The tool storage magazine has already been indexed to present the empty tool storage slot for receipt of the old tool, thus, the transfer arm carrying the old tool can be extended to deposit the old tool in the empty tool slot, and the empty tool transfer arm which transported the new tool to the spindle can select yet another tool for the next cutting operation.

By this unique design, the machine tool cutting actions can be commenced and can proceed while certain tool retrieval and replacement transfer actions are being simultaneously performed by the automatic tool changer. This shortens the time during which the spindle must remain stationary and thus is unable to perform a machining action.

While the double arm tool transferring mechanism of this invention is particularly well suited for use with milling machines, e.g., knee-type milling machines and bed-type milling machines, this tool transferring mechanism can be used with lathes and other metal removing machines as well.

Numerous other advantages and features of the present invention will become readily apparent from the following detailed description of the invention from the claims and from the accompanying drawings in which each and every detail is shown fully and completely disclosed as part of the specification.

BRIEF DESCRIPTION OF THE DRAWINGS

In the accompanying drawings, forming part of the specification, and in which like numerals are employed to designate like parts throughout the same, FIG. 1 is a front elevational view of the machine tool showing a general structure of the automatic tool changer with a tool storage magazine mounted on an extension of the machine frame;

FIG. 2 is a side elevation view of the machine tool with the automatic tool changer;

FIG. 3 is a top view of the machine tool with the tool storage magazine cover and control cabinet removed;

FIG. 4 is a partially cut away side elevation view of the tool changer mechanism taken at the plane 4—4 of FIG. 3;

FIG. 5 is a cross-sectional view taken at the plane 5—5 of FIG. 4;

FIG. 6 is a side elevation view of a tool holder with a cutting tool inserted;

FIG. 7 is a partial top view of the tool storage magazine partially cut away to show a tool holder on the carriage plate;

FIG. 8 is a cross-sectional view taken along the plane 8—8 of FIG. 7; and

FIGS. 9A through 9D are schematic diagrams of the automatic tool changing mechanism on the machine tool showing typical sequential positions of the transfer arms during a tool change operation.

DESCRIPTION OF THE PREFERRED EMBODIMENT

While this invention is susceptible of embodiment in many different forms, there is shown in the drawings and will herein be described in detail, one specific embodiment, with the understanding that the present disclosure is to be considered as an exemplification of the principles of the invention and is not intended to limit the invention to the embodiment illustrated.

Referring to the drawings in FIG. 1, the numeral 10 designates generally a vertical milling machine equipped with the automatic tool changer of this invention.

The tool changer comprises motor-actuated tool transfer means 18 which selects a desired tool from tool storage magazine 14. Milling machine 10 is comprised of a main frame 22, an extension of which also forms a support for the tool storage magazine 14. Cover 13 extends from main frame 22 over tool storage magazine 14. As shown in FIG. 1 and FIG. 3, tool transfer means 18 includes a column-like, substantially cylindrical structure with a double armed boom mounted to the frame 22 generally between milling machine 10 and tool storage magazine 14.

Vertical milling machine 10 includes knee 26 carried by frame 22 and which is mounted for vertical sliding movement on frame 22. Carried on knee 26 is saddle 28. Saddle 28 is slidably mounted for movement in and out from the front of the machine. Carried on saddle 28 is work table 30 which is slidably mounted for movement to the left or to the right as viewed in FIG. 1. Movement of knee 26, saddle 28, and table 30 may be effected either manually or by power in a well known manner and in response to appropriate numerical control means.

Shown in FIG. 2, mounted above work table 30, and slidably attached to the front of frame 22, is spindle quill 34 which supports spindle 36 on its lower end for rotation when driven through spindle drive transmission 38 located above spindle quill 34. The vertical movement of spindle quill 34 in either direction is effected in usual well known manner.

Spindle 36 constitutes the operating station of the milling machine 10, is rotatably carried in the spindle head 34, and is adapted to receive a tool 40 for performing a desired machining operation within vertical cutting frame 31 (FIG. 2) and horizontal cutting frame 32 (FIG. 3). Spindle 36 is driven by power obtained from electric motor 37 (FIGS. 1 and 2) connected to drive the spindle through a spindle drive transmission 38 in a well known manner. In the preferred embodiment illustrated herein, the spindle is driven by a 5 or 7½ horsepower direct-current motor 37 with a variable speed selection from 40 to 4,300 revolutions per minute. The spindle 36 is mounted in a 5-inch quill unit with a 9-inch controlled quill stroke for the vertical axis.

Any one of a wide variety of tools can be attached to the spindle to be driven thereby. This includes drills, reamers, boring bars, taps, milling cutters of all types, and the like. Each tool is fixed in a tool holder. Such a tool holder containing a tool is shown generally by numeral 40 holding a tool 41 located in spindle 36 at the right side of FIG. 1. An enlarged view of tool holder 40, holding tool 41, is shown in FIG. 6. All of the tool holders are identical and each has a tapered shank 42 which fits into a correspondingly tapered opening in spindle 36. The automatic tool transfer means 18, by which the tools are inserted into spindle 36, holds the tool (in a tool holder) at a fixed elevation during attachment of a tool to spindle 36. The mechanism used in spindle 36 to grasp and hold tool holder 40 is not a part of this invention and can be of any suitable type. One such mechanism comprises a pair of grasping fingers (not shown) pivoted at one end of a reciprocating draw bar inside the spindle bore and moved to a grasping position as the draw bar is retracted further into the spindle bore.

A tool holder 40 is also shown in FIG. 1 located in tool magazine 14 at the left side of FIG. 1. The tool holders suitable for present purposes can be of the gear drive type, such as are commercially available from the Caterpillar Company, Peoria Illinois. They have two circumferential grooves axially spaced from the large diameter end of the tapered shank 42 and from each other as shown in FIG. 6. The grooves are defined by three flanges 43, 44 and 45. The uppermost flange 43 is also a gear and engages with a gear drive mechanism in spindle 36. The tool holders are held in tool storage magazine 14 in the vertical position by engagement into slots in carrier plate 15 (FIG. 1) in the upper of the two grooves of the tool holder. FIGS. 7 and 8 are a top cut away view and a cross-sectional view respectively, of tool storage magazine 14, showing a portion of carrier plate 15 with a tool holder 40 positioned in one of slots 17 and being supported in its upper groove between flanges 43 and 44.

Generally, for use with the automatic tool changer of this invention, tool storage magazine 14 is a rotatable circular covered assembly holding from 12 to 25 tools in separate peripheral tool holder holding slots located in carrier plate 15 mounted on a turntable 16. A suitable mechanism and control means is used to index the tool storage slot to a singular specified tool engaging position. A rotor base 46 and control cabinet 47 is shown in FIG. 1 and FIG. 2. Each of the tools is position indexed in the tool storage magazine 14. That is, a given tool is removed from a slot of tool storage magazine 14 for use in milling machine 10 and is subsequently returned to its same slot of the tool storage magazine 14. The tool engaging position of tool storage magazine 14 is shown as the dashed line box and is designated generally by numeral 48 in FIG. 3.

Tool changer means 18 transfers tools between tool storage magazine 14 and spindle 36. As shown in FIG. 3, tool changer means 18 is positioned generally between tool storage magazine 14 and spindle 36. Guide housing 50 is secured to the frame 22 as shown in FIG. 1 and FIG. 4. Carriage assembly 52 is slidably positioned in guide housing 50. Any suitable means or guide bars may be employed in guide housing 50. The distal end of carriage assembly 52 that is slidably positioned in guide housing 50 comprises drive plate 54 (FIG. 4) which is attached to hydraulic cylinder actuator 56. The other end of hydraulic cylinder actuator 56 is mounted on the upper portion of guide housing 50. Through the extension and contraction of hydraulic cylinder 56, carriage 52 is reciprocally moved vertically in guide housing 50. The vertical displacement normally can be about 2 inches to about 8 inches, as necessary to remove the tool when positioned in the spindle. Rotary actuator 60 is disposed at the bottom end of carriage assembly 52 for rotating on axial shaft 62 shown in FIG. 5. Rotary actuator 60 can be of any suitable type, either electric or hydraulic. Boom 64 is carried by carriage assembly 52 on the bottom of rotary actuator 60 and keyed to shaft 62. Boom 64 can be thus rotated by rotary actuator 60 in either clockwise direction or counterclockwise direction as viewed in FIG. 3. In FIG. 1, boom 64 is shown in phantom swung towards tool storage magazine 14. Mounted from the end of boom 64, at a fixed acute angle with respect to each other, are first transfer arm 68 and second transfer arm 69 as shown in FIG. 5. In FIG. 5 first transfer arm 68 is shown partially extended and second transfer arm 69 is contracted. FIG. 4 shows first transfer arm 68 consisting of flat plate 70, sliding beneath top plate member 72 of boom 64.

Fluid-actuated mechanical fingers are used to grip the tool holders. For example, a pair of hydraulically-actuated tool gripping fingers 74 and 75 is provided at the end of both the first transfer arm 68 and the second transfer arm 69.

Hydraulic cylinder 76 is secured to the bottom of boom 64 (FIG. 4) and the drive rod 78 of hydraulic cylinder 76 is secured to the bottom of stationary gripping finger 82 to provide planar reciprocal movement of transfer arm 68. Through extension and contraction of the hydraulic cylinder 76, transfer arm 68 can be moved to extend or contract. Second transfer arm 69 is constructed in a manner substantially similar to transfer arm 68, and in an analogous manner, second transfer arm 69 is extended and contracted by hydraulic cylinder 77 (shown hidden with dashed lines in FIG. 5).

The pairs of gripping fingers 74 and 75 on each arm are substantially identical as shown in FIG. 5. Considering the construction of finger pair 74, movable finger 80 is pivotally mounted about pivot shaft 84. The finger has gripping end 86 and driven end 88. Hydraulic cylinder 90 is disposed between stationary finger 82 and driven end 88 of movable finger 80. Hydraulic fluid is admitted to hydraulic cylinder 90 through line 92 for actuating hydraulic cylinder 90 to butt against driven end 88 of movable finger 80, thereby pivoting movable finger 80 about pivot shaft 84 to bring gripping end 86 of movable finger 80 into a closer relative position to stationary finger 82. In this mode, pair of fingers 74 engages and holds a tool holder received therebetween. Bias spring 94 is attached on one end to stationary finger 82 and on the other end to the driven end 88 of movable finger 80. When hydraulic pressure is removed from hydraulic cylinder 90, bias spring 94 acts on the driven end 88 of movable finger 80 to pivot the finger about pivot shaft 84, to move gripping end 86 of finger 80 away from stationary finger 82, thereby positioning pair of gripping fingers 74 in an open position for disengaging and releasing a tool holder.

The pair of gripping fingers 75 is constructed similarly to, and operates analogously to, pair of gripping fingers 74. The pair of gripping fingers 75 comprises stationary fingers 83 with pivot shaft 85 on which is mounted movable finger 81 having gripping end 87 and driven end 89. The pair of fingers 75 is closed and opened by movement of movable finger 81 when actuated to close by fluid through line 93 acting on hydraulic cylinder 91 and when biased to open by bias spring 95.

The included angle between transfer arms 68 and 69 is an acute angle, which peferably is as small as possible consistent with the spacing of adjacent tools in the tool storage magazine and available space below and adjacent to the spindle. Preferably the included angle is about 45 degrees to about 10 degrees, and more preferably about 20°.

Referring now to FIGS. 1, 2, 3 and 9A, 9B, 9C and 9D, the unique operational advantages accruing to this novel design will now be explained. The description will assume that workpiece 96 has been properly secured to work table 30 and is undergoing a cutting operation with tool 41 that has already been loaded in spindle 36.

FIGS. 9A through 9D show a schematic representation of the top view of machine tool 10 and various illustrative tool transferring positions of transfer arms 68 and 69 as they swing about the axis of the tool changer means 18 between tool storage magazine 14 and spindle 36.

The tool transfer sequence is initiated when the control system indexes tool storage magazine 14 to bring the new machine cutting tool required for the next machining step into the tool engaging position 48. Boom 64 has been previously vertically positioned as shown in FIG. 1 and FIG. 3 to align the pair of gripping fingers 74 of first transfer arm 68 with the tool holder 40 transfer groove. This groove is defined by flanges 44 and 45 shown in FIG. 6. The azimuthal position of the boom 64 and the transfer arm 68 and 69 in this step are shown in FIG. 9A. Subsequently, the first transfer arm 68 is extended to engage the pair of gripping fingers 74 with the tool transfer groove of tool holder 40. The pair of gripping fingers 74 is then actuated to the closed (holding) position around tool holder 40 and first transfer arm 68 is then retracted to pull tool holder 40 out of the tool storage magazine 14.

Rotary actuator 60 then rotates boom 64 in a counterclockwise direction (as viewed in FIG. 3) to bring first transfer arm 68 and second transfer arm 69 into close proximity with the tool spindle 36. Transfer arm 69 is brought into alignment with spindle 36 such that no further rotational movement of boom 64 is required to permit engagement of the pair of gripping fingers 75 on transfer arm 69 with the tool holder in spindle 36. The final azimuthal position of the boom 64 and the two transfer arms 68 and 69 in this step is shown in FIG. 9B.

Spindle 36 and the tool holder 40 are disengaged from the workpiece and brought to a predetermined, elevated tool transfer position. Arm 69 is then extended to engage gripping fingers 75 with tool holder 40 present in spindle 36. After gripping fingers 75 have engaged the tool holder in spindle 36, carriage assembly 52 is moved vertically downwards to remove the tool holder from the spindle 36. After the tool holder is moved vertically downwards in amount sufficient to be clear of spindle 36, transfer arm 69 retracts to pull the used tool holder clear of the spindle 36.

Subsequently, boom 64 is rotated another 20° in the counterclockwise direction as viewed in FIG. 9C to align transfer arm 68, which is holding the new tool, with spindle 36. Movement of carriage assembly 52 upwards in the vertical direction brings the new tool holder into engagement with spindle 36. At the proper engagement height, the vertical movement of carriage assembly 52 is terminated and at about the same time the spindle collar mechanism engages the tool holder in the spindle. Gripping fingers 74 on transfer arm 68 are then actuated to open and release the tool holder. Subsequently, transfer arm 68 is retracted away from spindle 36 and both arms 68 and 69 are pivoted in a counterclockwise direction towards tool storage magazine 14.

As soon as the trailing transfer arm 69 clears the work area, the next machining step can be commenced. The new tool in the spindle 36 can then be brought into contact with workpiece 96 on work table 30. While the next machining step is being performed, the automatic tool changer completes the tool changing process. The second transfer arm 69, which is holding the used tool holder and tool, must now be rotated in the counterclockwise direction as viewed in FIG. 9D to bring it into alignment with the tool engaging position 48 of the tool storage magazine 14.

While the old tool was being removed from spindle 36 and the new tool inserted, tool storage magazine 14 was being indexed to present the original tool storage slot, for the used tool, to the tool engaging position 48. The second transfer arm 69 is then extended to insert into that tool storage slot the used tool. After the transfer arm 69 has extended the amount required to engage the used tool holder into the tool storage slot, gripping fingers 75 are actuated to open and release the tool holder. The transfer arm 69 is then retracted and the boom 64 is rotated to bring the first transfer arm 68 into alignment with the tool engaging position 48 of the tool storage magazine 14 as shown in FIG. 9A. Tool storage magazine 14 is then automatically indexed to present the next tool into tool engaging position 48 for engagement by the first transfer arm 68 in preparation for the next tool transfer.

It is to be understood that the foregoing operational sequence is illustrative only. The tool transfer arm functions also can be interchanged by an appropriate change in the operational program without departing from present invention.

As can be seen, the use of pivoting boom-mounted extensible arms permits the transfer arms 68 and 69 to be swung between the spindle 36 station and tool storage magazine 14 clear of the spindle axis.

In addition, the configuration of a fixed acute angle, shown in the preferred embodiment as 20°, permits both transfer arms 68 and 69 to be swung into position at the spindle 36 in the small amount of time required to move the arms through an arc of 20°. The larger the angle between the transfer arms, the larger the swinging arc required. As the swinging arc increases, the time to accomplish the movement of the transfer arms through that arc increases. As such transfer time increases, the time interval during which the spindle does not have a new tool inserted increases. Thus, it is advantageous to keep the angle between the arms as small as possible. From practical considerations involved in the size of the tool holders and transfer arms, it has been found that an angle of about 20° is sufficiently small yet is still able to accommodate tool holders with large size tools.

It has been found advantageous to use a pair of gripping fingers that are hydraulically powered so as to close to the "tool holding position." The use of spring closure mechanisms usually do not provide the uniform, positive large gripping force needed to hold heavy tool holders (with cutting tool attached) in the transfer arms when those arms undergo rapid rotary swinging movements that generate substantial centrifugal force.

The foregoing specification and drawings are intended as illustrative. Numerous other variations and modifications may be effected without departing from the true spirit and scope of the present invention, as will be readily apparent to one skilled in the art.

What is claimed is:

1. A machine tool comprising:
    a frame;
    a rotatable tool spindle journaled in said frame;
    a tool storage magazine rigidly mounted on said frame and having a plurality of tool storage slots for storing a plurality of tools;
    indexing means for said storage magazine to present a selected tool storage slot containing a tool to an engaging position for tool pickup and to subsequently present a selected empty storage slot to said engaging position for tool replacement;
    tool changer means for transferring tools between said storage magazine and said spindle comprising a carriage slidably mounted on said frame for sliding substantially parallel to the axis of said spindle and a boom pivotally mounted on one end in said carriage, said boom having mounted thereon first and second telescoping tool transfer arms substantially coplanar and perpendicular to the axis of said spindle and said telescoping tool transfer arms extending away from one end of the boom displaced relative to each other at a fixed acute angle and together with the boom forming a substantially Y-shape;
    motor means for sliding said carriage to raise and lower said boom reciprocally and substantially perpendicular to the plane of said transfer arms, and substantially parallel to the axis of said spindle;
    motor means for pivoting said boom together with said transfer arms in a plane substantially normal to said spindle axis whereby each of said transfer arms can be positioned to engage a tool at said storage magazine engaging position and present said tool for reception by said spindle; and
    control means for energizing said motor means and operating said storage magazine and said tool changer means whereby said boom is moved in sequence to locate said first transfer arm at said storage magazine engaging position to pick up a new tool, to subsequently locate said second transfer arm at said spindle to remove a used tool from said spindle, to subsequently locate said first transfer arm at said spindle to load said new tool into said spindle, and to subsequently locate said second transfer arm at said storage magazine engaging position to replace said used tool.

2. The machine tool, as defined in claim 1, in which said transfer arms are displaced relative to each other at an included angle of about 45° to about 15°.

3. The machine tool, as defined in claim 1, in which said transfer arms are displaced relative to each other at an angle of about 20°.

4. The machine tool as defined in claim 3, wherein said frame supports said spindle from above said spindle; wherein said carriage is slidably mounted relative to said storage magazine and said spindle so that said second transfer arm is positioned between said first transfer arm and said spindle when said first transfer arm is located at said storage magazine engaging position; and wherein said frame is spaced away from the bottom and sides of said spindle so that said second transfer arm is positioned between said spindle and said frame when said first transfer arm is located at said spindle to load said new tool into said spindle.

5. The machine tool as defined in claim 1, wherein said control means includes a first arm actuation means for extending said telescoping first transfer arm the distance necessary to engage said new tool when said first transfer arm is located at said storage magazine engaging position and for extending said first transfer arm the distance necessary to permit loading of said new tool into said spindle; and wherein said control means includes a second arm actuation means for extending said second transfer arm the distance necessary to permit removal of said used tool from said spindle and for extending said second transfer arm the distance necessary to replace said used tool when said second transfer arm is located at said storage magazine engaging position.

6. A machine tool as claimed in claim 4 in which said first arm actuation means comprises a hydraulically actuated piston mounted to said first transfer arm and said second arm actuation means comprises a hydraulically actuated piston mounted to said second transfer arm.

7. The machine tool as defined in claim 1, in which a pair of coacting tool gripping fingers is located at the distal end of each of said transfer arms.

8. The machine tool, as defined in claim 7, in which said pair of gripping fingers are mounted for movement relative to each other between an open position and a holding position for securing a tool to be transferred by said arm.

9. The machine tool as defined in claim 8, in which said pair comprises a first finger and a second finger; wherein said first finger is fixed and said second finger has a gripping end and a driven end, is pivotally mounted between the gripping end and the driven end on said distal end of said transfer arm adjacent to said first finger for movement of said gripping end of said second finger toward and away from said first finger.

10. A machine tool, as defined in claim 9, in which a hydraulically actuated piston is connected to said transfer arm and to said driven end of said second finger for moving said gripping end of said second finger toward said first finger to said holding position and in which a bias spring is connected between said transfer arm and said driven end of said second finger for moving said gripping end of said second finger away from said first finger to said open position when said hydraulic piston is not actuated.

* * * * *